United States Patent
Soryal et al.

(10) Patent No.: US 12,058,150 B2
(45) Date of Patent: Aug. 6, 2024

(54) MASSIVE VULNERABLE SURFACE PROTECTION

(71) Applicant: AT&T Intellectual Property I, L.P., Atlanta, GA (US)

(72) Inventors: Joseph Soryal, Glendale, NY (US); Dylan Chamberlain Reid, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 529 days.

(21) Appl. No.: 17/351,563

(22) Filed: Jun. 18, 2021

(65) Prior Publication Data
US 2022/0407871 A1 Dec. 22, 2022

(51) Int. Cl.
*H04L 29/06* (2006.01)
*G06N 20/00* (2019.01)
*H04L 9/40* (2022.01)

(52) U.S. Cl.
CPC ......... *H04L 63/1416* (2013.01); *G06N 20/00* (2019.01); *H04L 63/1425* (2013.01); *H04L 63/1466* (2013.01); *H04L 63/0428* (2013.01)

(58) Field of Classification Search
CPC ............. H04L 63/1416; H04L 63/1425; H04L 63/1466; H04L 63/0428; G06N 20/00
USPC ......................................................... 726/22
See application file for complete search history.

(56) References Cited

U.S. PATENT DOCUMENTS

| | | | | |
|---|---|---|---|---|
| 7,373,663 B2 * | 5/2008 | Robert | ................ | H04L 63/1408 726/22 |
| 8,321,936 B1 * | 11/2012 | Green | ................. | H04L 63/1416 718/1 |
| 8,683,593 B2 * | 3/2014 | Mahaffey | .............. | H04W 12/08 726/25 |
| 8,881,292 B2 * | 11/2014 | Mahaffey | .............. | H04W 12/08 726/25 |
| 9,819,685 B1 * | 11/2017 | Scott | ..................... | H04L 63/104 |
| 2003/0188189 A1 * | 10/2003 | Desai | .................... | H04L 63/104 726/23 |

OTHER PUBLICATIONS

Performance comparison of trust-based reactive routing protocol, Pirzada et al, Jun. 2006 (Year: 2006).*

* cited by examiner

*Primary Examiner* — Jahangir Kabir
(74) *Attorney, Agent, or Firm* — Guntin & Gust, PLC; Atanu Das

(57) ABSTRACT

Network security is applied to identify malicious activity occurring on a network or at network nodes from a coordinated attack. For instance, a device, comprising a memory and a processor, can generate a first flag signal representative of a first flag applicable to first data and a second flag signal representative of a second flag applicable to second data in response to the first and second data being determined to be related and directed to a common destination node using identifiers associated with network equipment.

20 Claims, 13 Drawing Sheets

```
                                                                    ┌─ 900
                                                                    ▼
┌──────────────────────────────────────────────────────────────────────┐
│  DETERMINING FIRST DATA, ASSOCIATED WITH FIRST NETWORK               │
│  EQUIPMENT, ORIGINATING AT A FIRST ORIGINATION NODE OF A GROUP       │
│  OF NODES, AND SECOND DATA, ASSOCIATED WITH SECOND NETWORK           │
│  EQUIPMENT, ORIGINATING AT A SECOND ORIGINATION NODE OF THE          │
│                       GROUP OF NODES                                 │
└──────────────────────────────────────────────────────────────────────┘
```

902 — DETERMINING FIRST DATA, ASSOCIATED WITH FIRST NETWORK EQUIPMENT, ORIGINATING AT A FIRST ORIGINATION NODE OF A GROUP OF NODES, AND SECOND DATA, ASSOCIATED WITH SECOND NETWORK EQUIPMENT, ORIGINATING AT A SECOND ORIGINATION NODE OF THE GROUP OF NODES

904 — GENERATING A FIRST IDENTIFIER ASSOCIATED WITH THE FIRST NETWORK EQUIPMENT AND THE FIRST ORIGINATION NODE AND A SECOND IDENTIFIER ASSOCIATED WITH THE SECOND NETWORK EQUIPMENT AND THE SECOND ORIGINATION NODE

906 — UPDATING THE FIRST DATA TO COMPRISE THE FIRST IDENTIFIER AND THE SECOND DATA TO COMPRISE THE SECOND IDENTIFIER

908 — IN RESPONSE TO THE FIRST DATA AND THE SECOND DATA BEING DETERMINED TO BE DIRECTED TO A COMMON DESTINATION NODE, DETERMINING WHETHER THE FIRST DATA AND THE SECOND DATA ARE RELATED ACCORDING TO A RELATION CRITERION

910 — IN RESPONSE TO DETERMINING THAT THE FIRST DATA AND THE SECOND DATA ARE RELATED, GENERATING A FIRST FLAG SIGNAL REPRESENTATIVE OF A FIRST FLAG APPLICABLE TO THE FIRST DATA AND A SECOND FLAG SIGNAL REPRESENTATIVE OF A SECOND FLAG APPLICABLE TO THE SECOND DATA

FIG. 9

MASSIVE VULNERABLE SURFACE PROTECTION

TECHNICAL FIELD

The disclosed subject matter relates to network security, and more particularly, to identifying malicious activity occurring on a network or at network nodes.

BACKGROUND

With the continuing emergence of fifth generation (5G) and beyond technologies with billions of high speed of connected devices attached to the network, attack surfaces are becoming unmanageable with current security technologies. Low volume coordinated malicious traffic originating from millions of points in the network that attack a single point or multiple points can easily go undetected. For instance, thousands of infected Information of Things (IoT) devices can be triggered at a given time to bombard a network element, server, etc. to mount a Denial of Service (DoS) or a penetration attack. Malicious traffic may utilize different paths (e.g., via proxies) to reach a single destination. Intermediate nodes in a network often do not have insight into a beginning or end of a data flow, and thousands of IoTs could collaborate from worldwide originations (e.g., origination nodes or locations) to attack one or two servers (or more), which can be difficult to track, especially when data flows are encrypted.

The above-described background relating to coordinated malicious traffic from multiple nodes is merely intended to provide a contextual overview of some current issues, and is not intended to be exhaustive. Other contextual information may become further apparent upon review of the following detailed description.

BRIEF DESCRIPTION OF DRAWINGS

FIG. 9 is a block flow diagram for a process for generating flag signals in accordance with one or more embodiments described herein.

DETAILED DESCRIPTION

Figure 1:
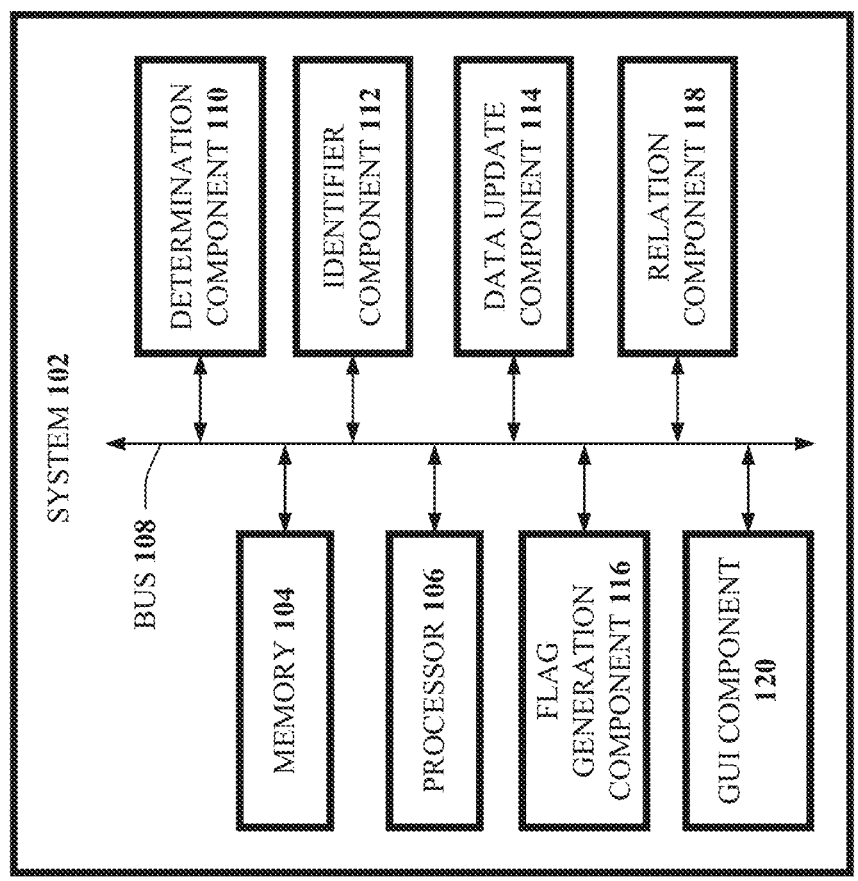
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, there exists a need to improve ways to detect malicious activity across networks and/or network nodes, and various embodiments are described herein to this end and/or other ends.

According to an embodiment, a device can comprise: a processor; and a memory that stores executable instructions that, when executed by the processor, facilitate performance of operations, comprising: determining first data, associated with first network equipment, originating at a first origination node of a group of nodes, and second data, associated with second network equipment, originating at a second origination node of the group of nodes; generating a first identifier associated with the first network equipment and the first origination node and a second identifier associated with the second network equipment and the second origination node; updating the first data to comprise the first identifier and the second data to comprise the second identifier; in response to the first data and the second data being determined to be directed to a common destination node, determining whether the first data and the second data are related according to a relation criterion; and in response to determining that the first data and the second data are related, generating a first flag signal representative of a first flag applicable to the first data and a second flag signal representative of a second flag applicable to the second data.

It is noted that, in some embodiments, the first flag signal and the second flag signal can be representative of warning information that enables a warning about malicious network traffic.

It is noted that, in some embodiments, generating the first identifier can comprise hashing first data with the first identifier, and generating the second identifier can comprise hashing second data with the second identifier.

In some embodiments, the first flag signal can comprise first information indicative of a first color label and the second flag signal can comprise second information indicative of the first color label.

In various embodiments, the above operations can further comprise: updating the first data to comprise the first flag; and updating the second data to comprise the second flag.

In one or more embodiments, the relation criterion can comprise a common origination criterion.

In some embodiments, the relation criterion can be determined using machine learning based on previous data relationships.

In various embodiments, the relation criterion can be associated with a commonality of nodes traversed by data traffic.

It is further noted that, in some embodiments, the first data and the second data can each comprise encrypted data.

In one or more embodiments, the above operations can further comprise: in response to determining that the first data and the second data are related, determining whether the first data or the second data comprise malicious data according to a malicious data criterion.

It is noted that the malicious data criterion can be determined using machine learning based on previously identified malicious data.

In some embodiments, the first identifier and the second identifier can each comprise respective data origination information and data destination information.

In various embodiments, the first identifier further can comprise hardware information associated with the first origination node, and the second identifier can further comprise hardware information associated with the second origination node.

In another embodiment, a non-transitory machine-readable medium can comprise executable instructions that, when executed by a processor, facilitate performance of operations, comprising: determining a first data segment, associated with first network equipment, originating at a first origination node of a group of nodes, and a second data segment, associated with second network equipment, originating at a second origination node of the group of nodes; generating a first identifier associated with the first network equipment and the first origination node and a second identifier associated with the second network equipment and the second origination node; updating the first data segment to comprise the first identifier and the second data segment to comprise the second identifier; in response to the first data segment and the second data segment being determined to be directed to a common destination node, determining whether the first data segment and the second data segment are related according to a relation criterion; and in response to determining that the first data segment and the second data segment are related, generating a first warning signal representative of a first warning applicable to the first data and a second warning signal representative of a second warning applicable to the second data.

In various embodiments, the first identifier can comprise a first encrypted packet appended to the first data segment and the second identifier can comprise a second encrypted packet appended to the second data segment.

In one or more embodiments, the relation criterion is determined using machine learning based on previous data relationships.

In some embodiments, the relation criterion can be associated with a commonality of nodes traversed by data traffic determined using the machine learning based on the previous data relationships.

In yet another embodiment, a method can comprise: determining, by network equipment comprising a processor, first data, associated with first network equipment, originating at a first origination node of a group of nodes, and second data, associated with second network equipment, originating at a second origination node of the group of nodes; generating, by the network equipment, a first identifier associated with the first network equipment and the first origination node and a second identifier associated with the second network equipment and the second origination node; updating, by the network equipment, the first data to comprise the first identifier and the second data to comprise the second identifier; in response to the first data and the second data being determined to be directed to a common destination node, determining, by the network equipment, whether the first data and the second data are related according to a relation criterion; and in response to determining that the first data and the second data are related, generating, by the network equipment, a first flag signal representative of a first flag applicable to the first data and a second flag signal representative of a second flag applicable to the second data.

In some embodiments, the method can further comprise: in response to determining that the first data and the second data are related, determining, by the network equipment, whether the first data or the second data comprise malicious data according to a malicious data criterion.

In various embodiments, the malicious data criterion can be determined, by the network equipment, using machine learning based on previously identified malicious data.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can be configured to perform various operations relating to surface protection. The system 102 can comprise one or more of a variety of components, such as memory 104, processor 106, bus 108, determination component 110, identifier component 112, data update component 114, flag generation component 116, relation component 118, and/or graphical user interface (GUI) component 120.

In various embodiments, one or more of the memory 104, processor 106, bus 108, determination component 110, identifier component 112, data update component 114, flag generation component 116, relation component 118, and/or GUI component 120 can be communicatively or operably coupled (e.g., over a bus or wireless network) to one another to perform one or more functions of the system 102.

According to an embodiment, the determination component 110 can, for instance, determine data that originates at one or more of various nodes. In an embodiment, the determination component 110 can determine first data, associated with first network equipment, originating at a first origination node (e.g., of a group of nodes). The determination component 110 can also determine second data, associated with second network equipment, originating at a second origination node (e.g., of the group of nodes). In this regard, it is noted that the determination component 110 can determine data originating at a plurality of origination nodes (e.g., of the group of nodes or of a plurality of groups of nodes).

According to an embodiment, the determination component 110 can identify a data flow or a data stream originating at a node. In this regard, the determination component 110 can determine various information regarding the data flow or data stream, hardware information such as device type (e.g., network equipment), operating system (e.g., of said network equipment), location, time, target destination (e.g., if accessible), server type associated with the data, or other suitable information. The determination component 110 can further determine whether a virtual private network (VPN) is being utilized. The foregoing can occur, for instance, by monitoring network traffic (e.g., a data flow or data stream) for network elements (e.g., nodes) traversed. For example, if a data stream only traverses two nodes, the determination component 110 can determine that the two nodes traversed (e.g., routers) likely represent a beginning and an end of a VPN tunnel, as more than two nodes are frequently traversed when a VPN is not utilized. It is noted that data flows or streams herein can be encrypted, for instance, using Hypertext Transfer Protocol Secure (HTTPS).

According to an embodiment, the identifier component 112 can, for instance, generate identifiers associated with network equipment and nodes herein. According to an example, the identifier component 112 can generate a first identifier associated with the first network equipment and the first origination node. It is noted that such an identifier can comprise a token (e.g., an encrypted token). Said identifiers can comprise one or more packets encrypted with a hash function. In some embodiments, the identifier can be referred to as a "color label". In this regard, a first flag signal herein can comprise first information indicative of a first color label, and a second flag signal herein can comprise second information indicative of the first color label (or a second color label). In this regard, a first color label can be associated with first malicious activity (e.g., common origination or common pattern/path), and a second color label can be associated with second malicious activity (e.g., second common origination or second common pattern/path). Common malicious activity can be associated with a common color label.

It is noted that indicators herein can be compressed and/or encrypted and can comprise origination information representative of an origination of network equipment, an origination node, an origination location, or other suitable origination information. The indicator can further comprise destination information representative of a destination node, a destination location, or other suitable destination information. The indicator can further comprise information associated with network equipment or nodes traversed (e.g., from origination to destination) or other suitable information. In an embodiment, the identifier component 112 can generate a second identifier associated with the second network equipment and the second origination node. In this regard, it is noted that the identifier component 112 can generate identifying tokens associated with a plurality of network equipment and/or nodes (e.g., of the group of nodes or of a plurality of groups of nodes). It is noted that said identifiers can comprise various information regarding the data flow or data stream, such as hardware information such as device type (e.g., network equipment), operating system information (e.g., of said network equipment), location, time, target destination (e.g., if accessible), server type associated with the data, nodes travelled/traversed, or other suitable information. It is further noted that generating the first identifier can comprise hashing first data with the first identifier (e.g., using the identifier component 112) and generating the second identifier can comprise hashing second data with the second identifier (e.g., using the identifier component 112).

According to an embodiment, the data update component 114 can, for instance, update data (e.g., data flows or data streams herein) with an identifier (e.g., as generated by the identifier component 112). In this regard, the data update component 114 can, for instance, append an identifier (e.g., a token such as an encrypted packet) to such a data flow or data stream. In this regard, the data flow/stream can comprise information comprising all nodes traversed by the data flow. In an embodiment, the data update component 114 can update the first data to comprise the first identifier and the second data to comprise the second identifier.

According to an embodiment, the data update component 114 can update an existing identifier (e.g., with a new identifier) or delete an identifier. In this regard, the data update component 114 can "prune" information from a data flow (e.g., delete intermediate node information from an identifier if not relevant and only include main trunk and main branches of a spanning tree—see, e.g., FIG. 5).

According to an embodiment, the determination component 110 can be employed to determine whether data (e.g., data flows or data streams) are directed to a common destination node. The foregoing can be determined, for instance, based on nodes traversed and/or by destination nodes reached by said respective data flows. The determination component 110 can, according to an embodiment, utilize the identifiers (e.g., tokens) in the determination regarding whether data flows are directed to a common destination node. According to an embodiment, the determination component 110 can determine whether the first data and the second data are directed to a common destination node.

According to an embodiment, in response to the determination component 110 determining that first data and the second data are directed to a common destination node, the relation component 118 can determine whether the first data and the second data are related according to a relation criterion. Such a relation criterion can comprise a correlation between data flows herein. Such a relation criterion can be associated with collusion between IoTs on a network. According to an embodiment, a relation criterion herein can comprise a common origination criterion, indicative of whether two or more data flows originate at a common location or a common node. In another embodiment, the relation criterion can be associated with a commonality of nodes traversed by data traffic (e.g., data flows or data streams). For instance, after observing that two or more IoTs attempt to evade defined security measures and/or go out of their ways to traverse alternate routes with their respective data streams or flows (e.g., if both IoTs are physically/geographically close, then under normal conditions they should take the same or similar routes to the same destination) (e.g., as observed/determined by the determination component 110), then the relation component 118 and/or determination component 110 can determine the impact of such data streams or flows (e.g., on the destination or destination node). In this regard, the determination component 110 can determine whether such a destination or destination node experiences abnormal activity (e.g., as compared to previously identified activity). Further in this regard, the determination component 110, or another component herein, can store and/or access historical information about destinations and/or destination nodes for comparison to current activity at those destinations or destination nodes). For example, such abnormal activity can be indicative of a hacker sending traffic to a new destination that could be a victim, or can be indicative of a hacker's command and control server. In this regard, the determination component 110, or a different component herein, can determine whether a destination is generating or receiving more network traffic than it was previously (e.g., more than before receiving the traffic from the aforementioned IoTs that took such an alternate route in a potential attempt to remain stealthy). Further, the potentially colluding IoTs can send such traffic patterns or volumes or generate traffic at certain intervals that are similar to one another, but drastically different than similar IoTs elsewhere in the network (e.g., according to a traffic similarity criterion).

According to an embodiment, the flag generation component 116 generate flag signals representative of flags applicable to data herein. For instance, in response to the determination component 110 determining that the first data and the second data are related, the flag generation component 116 can generate a first flag signal representative of a first flag applicable to the first data and a second flag signal representative of a second flag applicable to the second data. In this regard, the first data and the second data can be respectively flagged. Flagging herein can be indicative of one data flow potentially colluding with another data flow, that a data flow originated from a bot or that a data flow comprises malicious information or was sent with malicious intent (e.g., DoS or a penetration attack). It is noted that flag signals can comprise or otherwise be representative of warning information that enables a warning about malicious network traffic.

According to an embodiment, the system 102 can generate a GUI, for instance, using the GUI component 120. In various embodiments, the GUI can visualize spanning trees or data flows and respective correlations herein. The GUI can further display alerts or warnings described herein (e.g., on a screen communicatively coupled to a system herein).

According to an embodiment, the system 102 can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, global system for mobile communications ("GSM"), code-division multiple access ("CDMA"), satellite, visual cues, radio waves, etc.)

Figure 2:
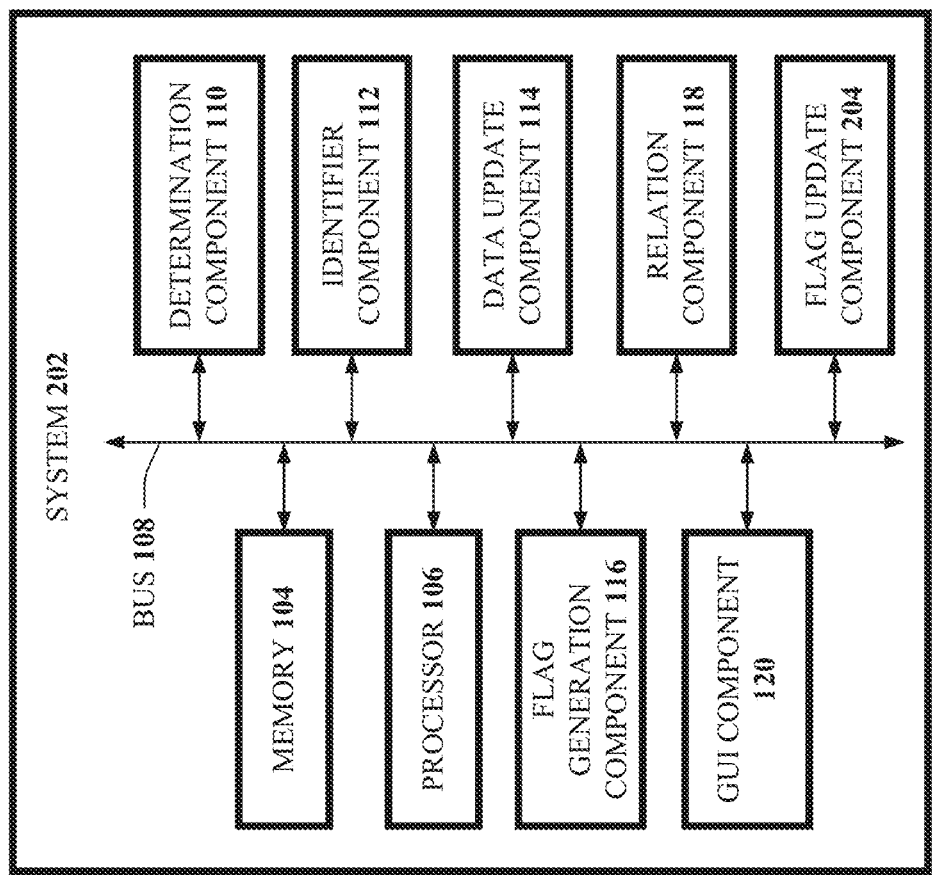
FIG. 2 is a block diagram of an exemplary system in accordance with one or more embodiments described herein.

Turning now to FIG. 2, there is illustrated an example, non-limiting system 202 in accordance with one or more embodiments herein. System 202 can be configured to perform various operations relating to surface protection. The system 202 can be similar to system 102, and can comprise one or more of a variety of components, such as memory 104, processor 106, bus 108, determination component 110, identifier component 112, data update component 114, flag generation component 116, relation component 118, and/or GUI component 120. The system 202 can additionally comprise a flag update component 204.

In various embodiments, one or more of the memory 104, processor 106, bus 108, determination component 110, identifier component 112, data update component 114, flag generation component 116, relation component 118, GUI component 120, and/or flag update component 204 can be communicatively or operably coupled (e.g., over a bus or wireless network) to one another to perform one or more functions of the system 202.

According to an embodiment, the flag update component 204 can update a data flow/stream to comprise a flag described herein. For instance, the flag update component 204 can update the first data to comprise the first flag and update the second data to comprise the second flag. In this regard, such a data flow/stream can be appended and/or hashed with such flag information comprising a flag. In some embodiments, identifiers herein can be referred to as "color labels". In this regard, a first flag signal herein can comprise first information indicative of a first color label, and a second flag signal herein can comprise second information indicative of the first color label (or a second color label). In this regard, a first color label can be associated with first malicious activity, and a second color label can be associated with second malicious activity. Common malicious activity can be associated with a common color label.

Figure 3:
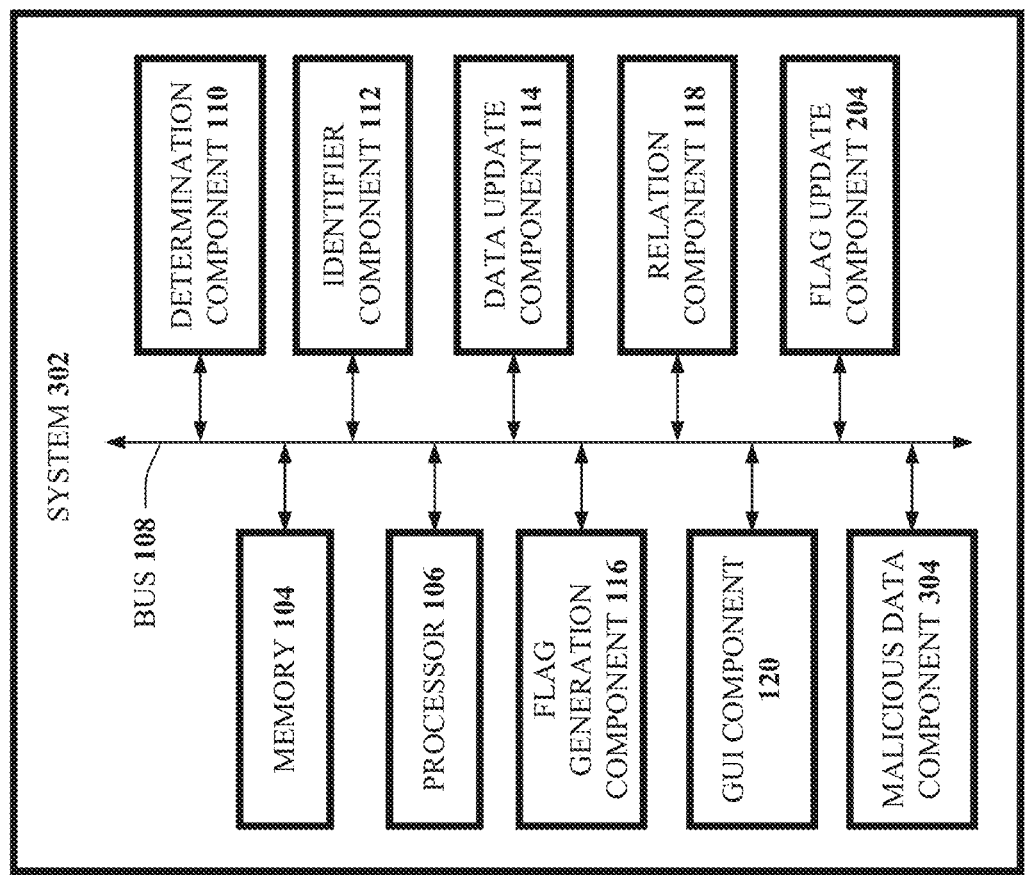
FIG. 3 is a block diagram of an exemplary system in accordance with one or more embodiments described herein.

Turning now to FIG. 3, there is illustrated an example, non-limiting system 302 in accordance with one or more embodiments herein. System 302 can be configured to perform various operations relating to surface protection. The system 302 can be similar to system 202, and can comprise one or more of a variety of components, such as memory 104, processor 106, bus 108, determination component 110, identifier component 112, data update component 114, flag generation component 116, relation component 118, GUI component 120, and/or flag update component 204. The system 302 can additionally comprise a malicious data component 304.

In various embodiments, one or more of the memory 104, processor 106, bus 108, determination component 110, identifier component 112, data update component 114, flag generation component 116, relation component 118, GUI component 120, flag update component 204, and/or malicious data component 304 can be communicatively or operably coupled (e.g., over a bus or wireless network) to one another to perform one or more functions of the system 302.

The malicious data component 304 can determine whether data flows/streams herein comprise malicious data or otherwise represent malicious traffic according to a malicious data criterion. According to an embodiment, in response to determining (e.g., using the relation component 118) that the first data and the second data are related, the malicious data component 304 can determine whether the first data or the second data comprise malicious data according to a malicious data criterion. Such a malicious data criterion can be representative of an association between the first and/or second data and defined malicious data. Malicious traffic can differ drastically from normal traffic. In this regard, such a malicious data criterion can be defined or refined over time (e.g., using machine learning) based on similarities or differences to previous network traffic patterns, volumes, intervals, or other suitable information, for instance, with respect to time, day, week, month, events, or other correlations. Further, malicious traffic can alter communication at a destination node. For example, malicious traffic can cause a destination node to stop communicating, or can cause a sudden increase in communication volume. Additionally, malicious traffic can force a destination or destination node to cause other network traffic to take alternate/different routes (as compared to before the malicious activity commenced) and/or can cause other network traffic to connect to new servers and/or peers.

Figure 4:
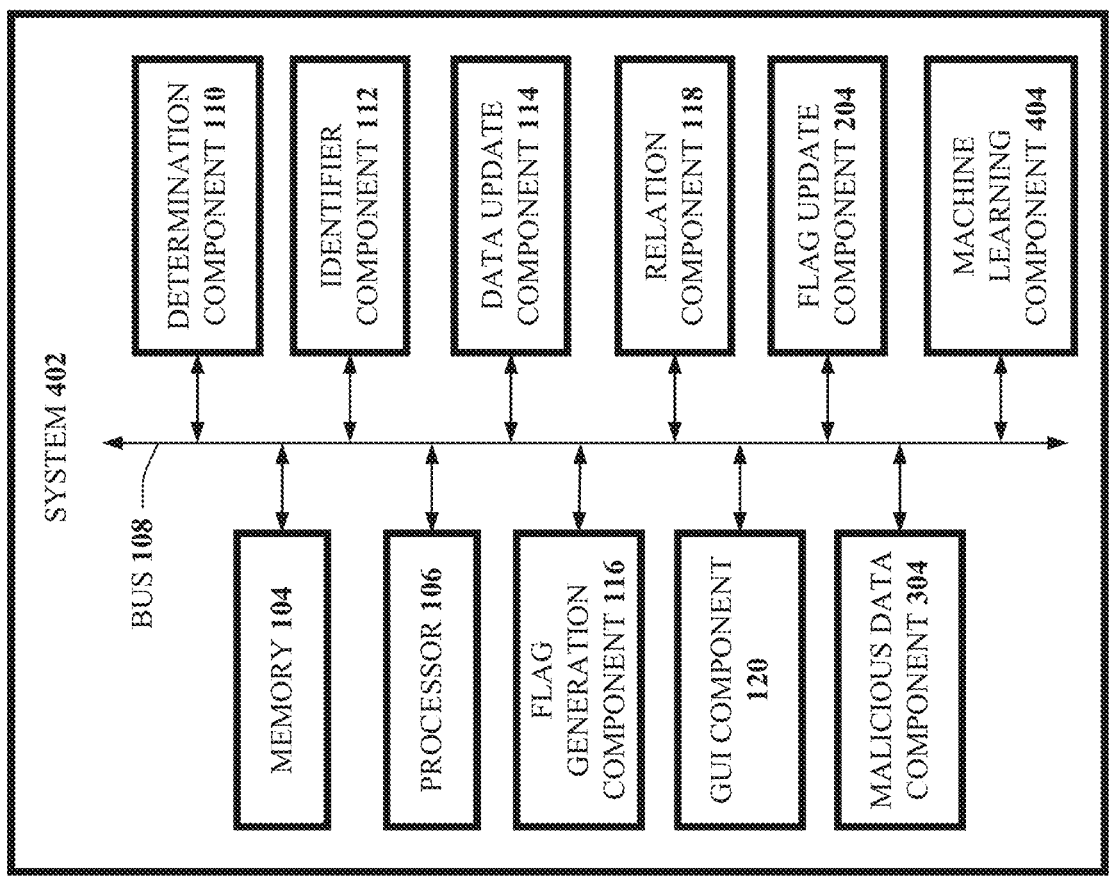
FIG. 4 is a block diagram of an exemplary system in accordance with one or more embodiments described herein.

Turning now to FIG. 4, there is illustrated an example, non-limiting system 402 in accordance with one or more embodiments herein. System 402 can be configured to perform various operations relating to surface protection. The system 402 can be similar to system 302, and can comprise one or more of a variety of components, such as memory 104, processor 106, bus 108, determination component 110, identifier component 112, data update component 114, flag generation component 116, relation component 118, GUI component 120, flag update component 204, and/or malicious data component 304. The system 402 can additionally comprise a machine learning component 404.

In various embodiments, one or more of the memory 104, processor 106, bus 108, determination component 110, identifier component 112, data update component 114, flag generation component 116, relation component 118, GUI component 120, flag update component 204, malicious data component 304, and or machine learning component 404 can be communicatively or operably coupled (e.g., over a bus or wireless network) to one another to perform one or more functions of the system 402.

The machine learning component 404 can, for instance, utilize machine learning/artificial intelligence to determine the relation criterion based on previous data relationships (e.g., stored in memory 104 by the machine learning component 404). In another embodiment, the machine learning component 404 can determine the malicious data criterion using machine learning based on previously identified malicious data (e.g., stored in memory 104 by the machine learning component 404).

According to an embodiment, the machine learning component 404 can learn "bad behavior" over time which, according to an embodiment, can be quantified by bad propagation. According to an example, feedback regarding "good behavior" can be utilized by the machine learning component 404 to determine said "bad behavior". In one or more embodiments, the machine learning component 404 can facilitate a "training period" over time to observe one or more of the following:

1. Transmitting Nodes—Traffic patterns (e.g., volume, intervals, spikes in activities, processing time between receiving traffic and responding); Routes taken (e.g., whether routes follow known algorithms, such as shortest path, least cost, or other suitable algorithms, or whether an IoT goes out of its way to be stealthy, such as taking a longer route when the shorter path is available)
2. Receiving Nodes—the machine learning component 404 can observe behavior after each type of IoT, after the machine learning component 404 receives traffic from specific types of nodes (e.g., malicious traffic received by such a node can force such an IoT node to behave differently than what was learned over time)

In this regard, server deviation can be flagged (e.g., by the determination component 110, flag generation component 116, malicious data component 304, machine learning component 404, or a different component herein) as potentially "malicious". According to an example, an IoT can receive or facilitate traffic, then said IoT can entirely stop communicating its peers. The system 402 can thus flag said traffic as potentially malicious. The system 402 can then observe an associated network to determine whether other nodes that received or utilized the same traffic behaved similarly. Consequently, the system 402 can then determine with high confidence that said IoT that originally sent said traffic is malicious node.

In an embodiment, the machine learning component 404 can determine additional relevant information to be included in an identifier herein (e.g., in addition to origination information representative of an origination of network equipment, an origination node, or an origination location, and destination information representative of a destination of network equipment, a destination node, or destination location information). In this regard, the machine learning component 404 can learn to identify information or categories of information that, based upon an analysis of stored information (e.g., by the machine learning component 404) can be relevant for identification of malicious activity or collaborative activity. Additionally, the machine learning component can learn to identify information or categories of information that can be indicative of "normal" (e.g., non-malicious) network traffic, and infer that an absence of said "normal" network traffic can lead to an inference (e.g., by the machine learning component 404) that network traffic may be malicious.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (AI) model and/or machine learning (ML) or a machine learning model that can learn to perform the above or below described functions (e.g., via training using historical training data and/or feedback data).

In some embodiments, machine learning component 404 can comprise an AI and/or ML model that can be trained (e.g., via supervised and/or unsupervised techniques) to perform the above or below-described functions using historical training data comprising various context conditions that correspond to various data identification, flagging, or warning operations. In this example, such an AI and/or ML model can further learn (e.g., via supervised and/or unsupervised techniques) to perform the above or below-described functions using training data comprising feedback data, where such feedback data can be collected and/or stored (e.g., in memory) by the machine learning component 404. In this example, such feedback data can comprise the various instructions described above/below that can be input, for instance, to a system herein, over time in response to observed/stored context-based information.

AI/ML components herein can initiate an operation(s) associated with a based on a defined level of confidence determined using information (e.g., feedback data). For example, based on learning to perform such functions described above using feedback data, performance information, and/or past performance information herein, a machine learning component 404 herein can initiate an operation associated with determining a relation criterion and/or a malicious data criterion.

In an embodiment, the machine learning component 404 can perform a utility-based analysis that factors cost of initiating the above-described operations versus benefit. In this embodiment, the machine learning component 404 can use one or more additional context conditions to determine relation information for an identifier, a relation criterion, and/or a malicious data criterion.

To facilitate the above-described functions, a machine learning component 404 herein can perform classifications, correlations, inferences, and/or expressions associated with principles of artificial intelligence. For instance, the machine learning component 404 can employ an automatic classification system and/or an automatic classification. In one example, the machine learning component 404 can employ a probabilistic and/or statistical-based analysis (e.g., factoring into the analysis utilities and costs) to learn and/or generate inferences. The machine learning component 404 can employ any suitable machine-learning based techniques, statistical-based techniques and/or probabilistic-based techniques. For example, the Machine learning component 404 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the machine learning component 404 can perform a set of machine-learning computations. For instance, the machine learning component 404 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Systems herein (e.g., systems 102-402) can be located on a network and/or edge elements and can monitor network traffic (e.g., encrypted network traffic). According to an embodiment, one or more network nodes can comprise system(s) 102-402. Systems herein (e.g., systems nearby destinations) can check back propagation (e.g., acting as bots or capture & command attacks from hackers) for misbehavior signs (e.g., from end receiving nodes), such as multiple steams of data augmented to form malware. Systems herein can make determinations (e.g., individually or collectively) from identifiers herein that there could exist malicious data traffic on an associated network.

It is noted that systems herein can comprise, or otherwise be implemented on, a network node, network interface card (NIC), router, switch, gateway, or other network elements. Systems herein can comprise a sorting application, which can be implemented, for instance, at each node of a network for network border control (e.g., read data flow information and add an identifier). Systems herein can compare content and/or paths to find anomalous data routes (e.g., that are attempting to hide true intentions), such as: (1) same traffic taking different routes for same origin/destination; (2) low amount of traffic that becomes congregated at some node; and/or (3) back propagation (e.g., misbehavior of receiving node)—after the node receives multiple streams starts to act erratically such as contacting capture & command or mounting an attack.

In one or more embodiments, systems herein can recognize common identifiers (e.g., tokens). In this regard, information corresponding to generated identifiers can be stored in an identifier database (e.g., in memory 104) by the identifier component 112 or another component herein. Likewise, flag information corresponding to generated flags can be stored, by the flag generation component 116 or another component herein, in a flag database (e.g., in memory 104). Further, the determination component 110, or another component herein, can recognize previously generated identifiers or flags based on a comparison to said identifier database and/or flag database. In this regard, repeat data flows from repeat network equipment (e.g., IoTs) can be determined based on similarities between present identifiers or flags, and previous identifiers or flags stored in said respective databases.

In another embodiment, systems herein can correlate or differentiate messages (e.g., data streams) between two or more IoTs and their respective attacks on a server. Said attacks can be executed in collusion or could be a bot or an infected IoT.

Figure 5:
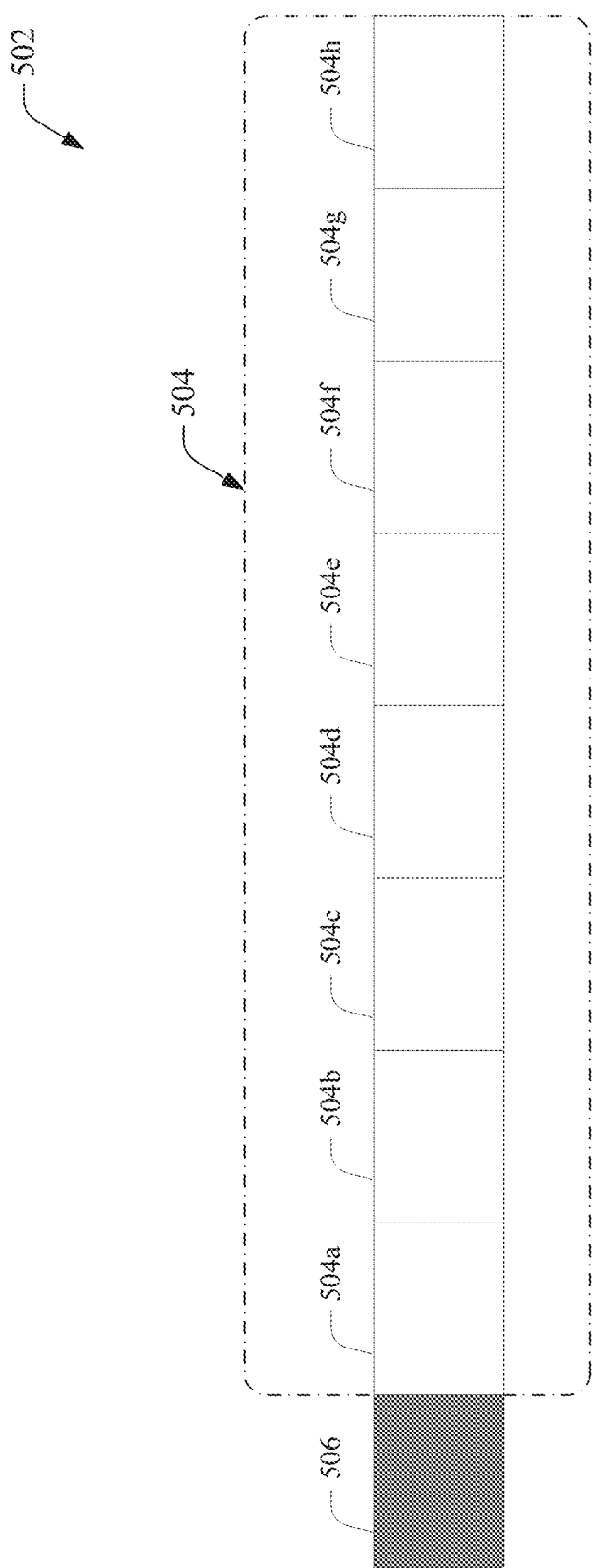
FIG. 5 is a block diagram of an exemplary packet stream in accordance with one or more embodiments described herein.

With reference to FIG. 5, there is illustrated an exemplary packet stream 502 in accordance with one or more embodiments described herein. The packet stream 502 can comprise a data stream 504 (e.g., a voice over internet protocol (VoIP) call). Data stream 504 can comprise a plurality of data segments (e.g., 504a, 504b, 504c, 504d, 504e, 504f, 504g, and/or 504h). According to an embodiment, such data segments can comprise a bit, a byte, a packet, or another suitable data segment. It is noted that data streams herein can be appended with an identifier 506 (e.g., a token or a packet) herein. In this regard, the data stream 504 can be updated to comprise the identifier 506 for further transmission as the data stream travels from node to node.

Figure 6:
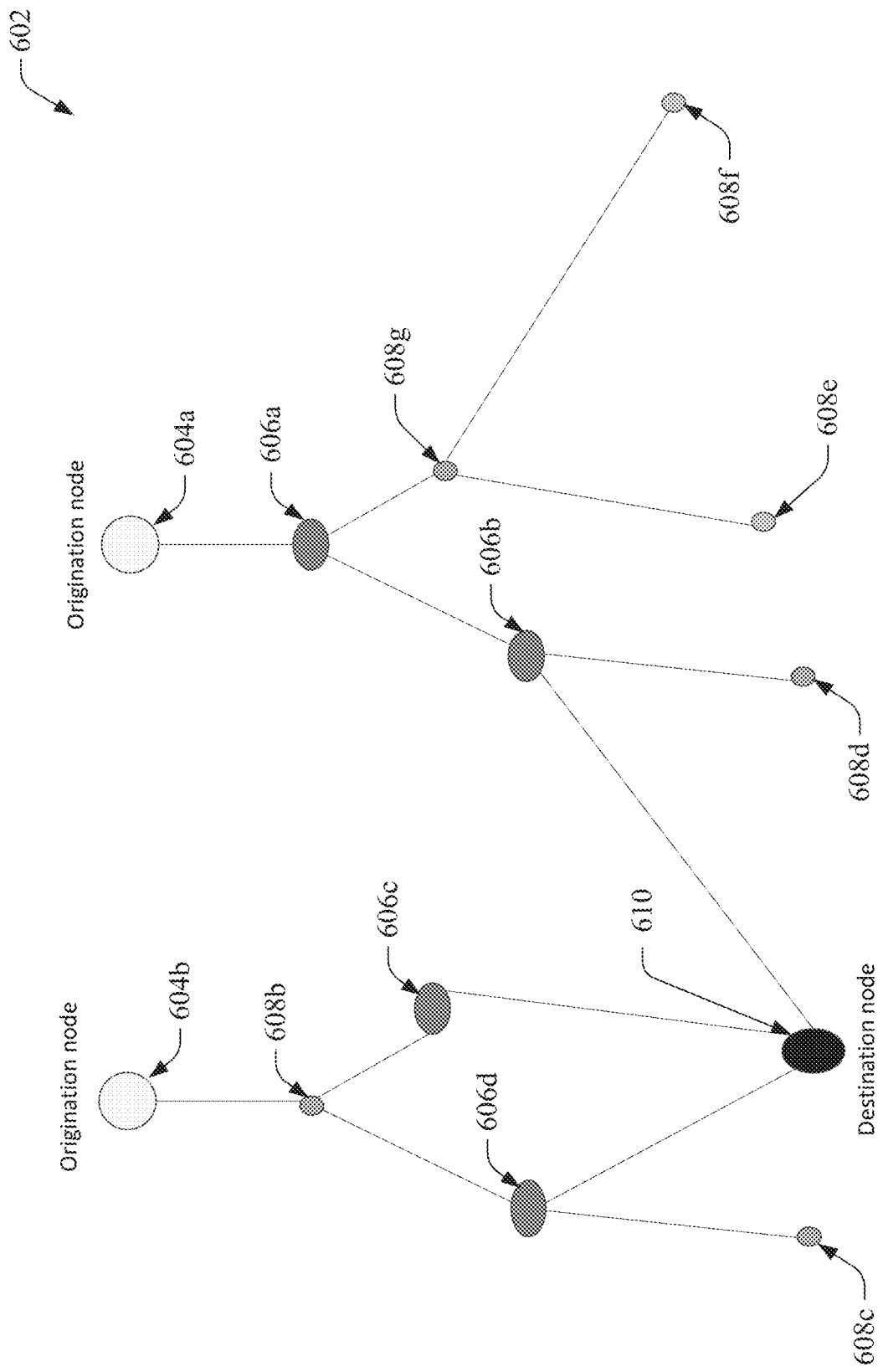
FIG. 6 is a depiction of an exemplary spanning tree in accordance with one or more embodiments described herein.

FIG. 6 illustrates an exemplary spanning tree 602 in accordance with one or more embodiments described herein. The spanning tree 602 can comprise origination nodes 604a and/or 604b, nodes 606a, 606b, 606c, and/or 606d, limited nodes 608a, 608b, 608c, 608e, and/or 608f, and/or destination node 610. Origination nodes (e.g., 604a and/or 604b) can be nodes at which an IoT first connects to a network (e.g., encompassed by the spanning tree 602). Nodes 606a-606d can each comprise a system herein (e.g., a system 102-402). In this regard, one or more of nodes 606a-606d can generate/append identifiers (e.g., tokens), perform packet reduction (e.g., pruning), observe attacks initiated at other nodes, observe traffic augmentation from multiple nodes which may indicate a virus that is attempting to evade security systems, and/or perform other suitable operations. Nodes 608a-f can comprise limited nodes, which can comprise limited functionality (e.g., of a system 102-402). In this regard, nodes 608a-f can generate/append identifiers which can comprise information associated with that respective limited node 608a-f. A destination node (e.g., destination node 610) can comprise a final node that a data flow reaches on a network (e.g., a server).

Figure 7:
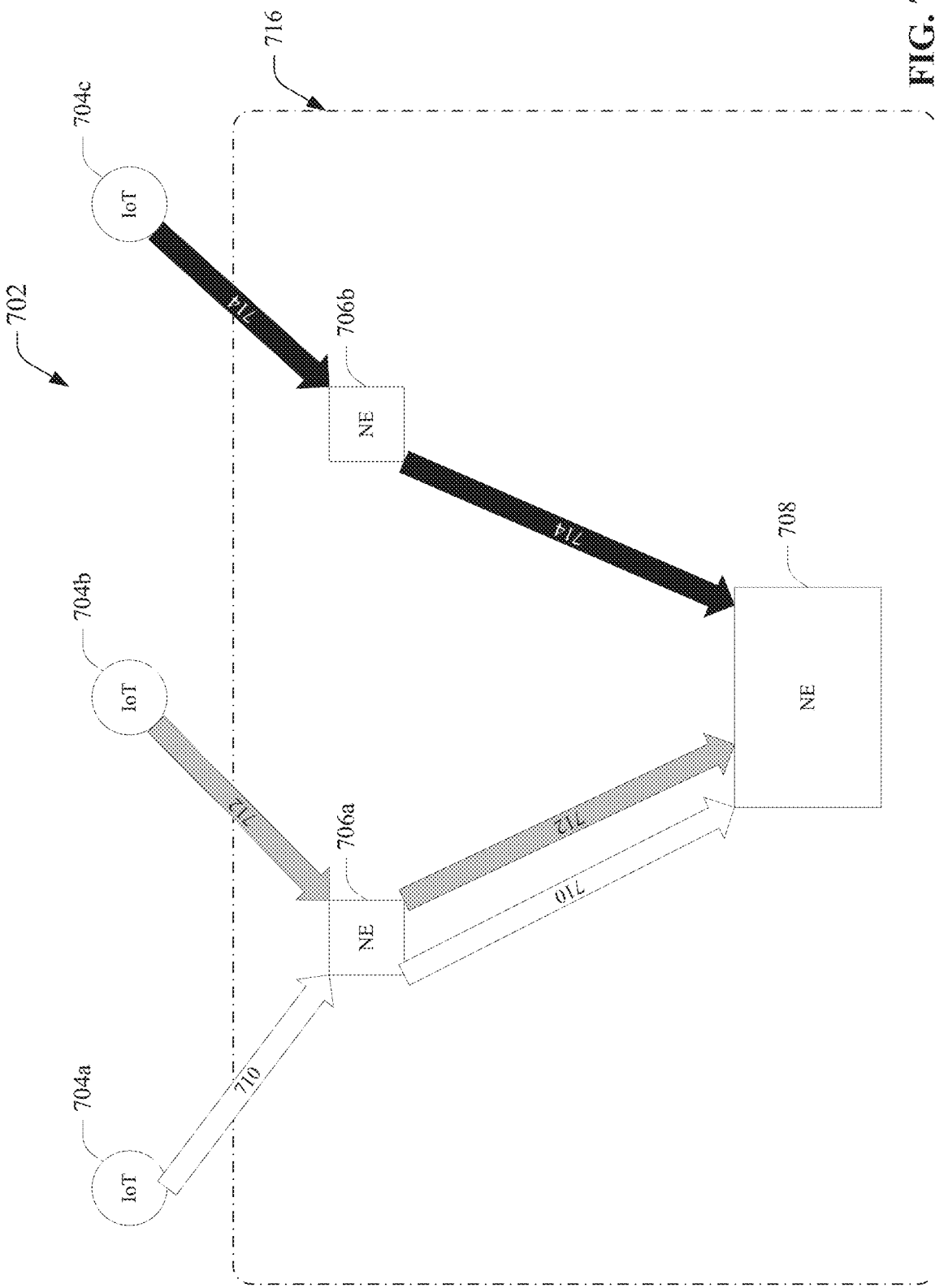
FIG. 7 is a block diagram of exemplary packet flow in accordance with one or more embodiments described herein.

With reference to FIG. 7, there is illustrated an exemplary packet flow 702 in accordance with one or more embodiments described herein.

IoT 704a, IoT 704b, and IoT 704c can each comprise network equipment herein. Each IoT 704 can send traffic (e.g., a data flow or stream) into a network 716. IoT 704a can generate data flow 710, IoT 704b can generate data flow 712, and IoT 704c can generate data flow 714. Data flows 710 and 712 can be directed to network equipment (e.g., a node) 706a. Node 706a (e.g., network equipment) can add a distinct hash (e.g., respective identifiers or tokens) to the data flows 710 and 712 on their paths to NE 708 (e.g., a destination node). Similarly, IoT 704c can send traffic into the network 716 by generating data flow 714 directed to the NE (e.g., node) 706b. Node 706b can add a distinct hash to the data flow 714 on its path to the NE 708. According to an embodiment, a system herein can determine that data flows 710 and 712 entered the network 716 at the same node 706a and target the same destination node 708. In this regard, the data flows (e.g., and respective IoTs) can be flagged. In another embodiment, because IoTs 704a-704c can all correspond to a common general location, all three data flows 710-714 and respective IoTs 704a-704c can be flagged.

Figure 8:
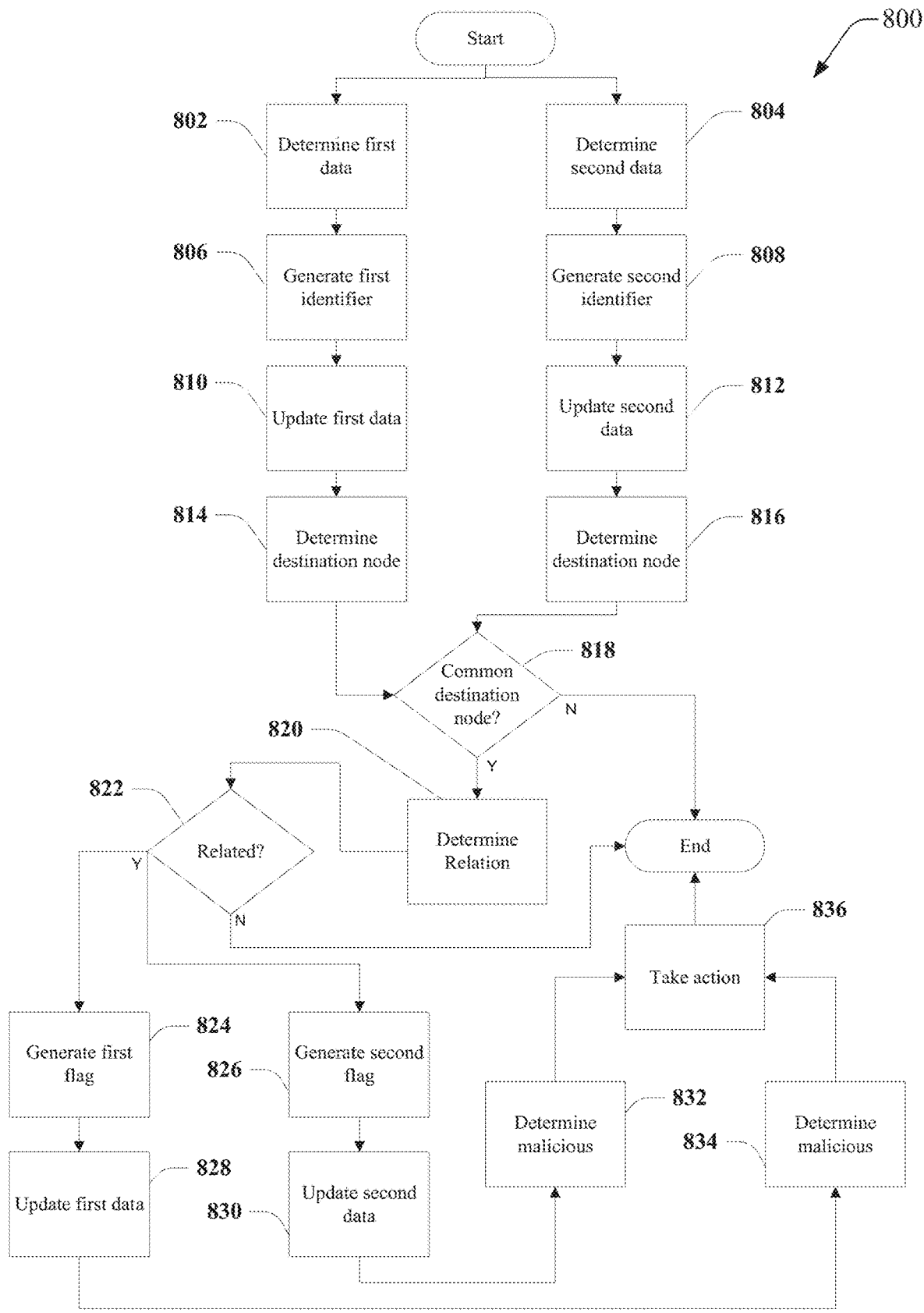
FIG. 8 is a flowchart of exemplary surface protection in accordance with one or more embodiments described herein.

Turning now to FIG. 8, there is illustrated a flow chart of a process 800 for surface protection in accordance with one or more embodiments described herein. At 802, a system (e.g., system 402) can determine first data (e.g., using a determination component 110) associated with first network equipment and originating at a first origination node. At 804, the system can determine second data (e.g., using the determination component 110) associated with second network equipment and originating at a second origination node. At 806, the system can generate (e.g., using an identifier component 112) a first identifier associated with the first network equipment and the first origination node. At 808, the system can generate (e.g., using the identifier component 112) a second identifier associated with the second network equipment and the second origination node. At 810, the system can update the first data with a first identifier (e.g., using a data update component 114). At 812, the system can update the second data with a second identifier (e.g., using the data update component 114). At 814, the system (e.g., using the determination component 110) can determine the destination node of the first data. At 816, the system (e.g., using the determination component 110) can determine the destination node of the second data. At 818, if the first data and the second data are directed to a common destination node, then the process can proceed to 820. If at 818, the first data and the second data are not directed to a common destination node, then the process can end. At 820, the system (e.g., using the determination component 110) can determine whether the first data and the second data are related (e.g., according to a relation criterion). If at 822, the first data and the second data are not related, then the process can end. If at 822, the first data and the second data are related, then the process can proceed to 824 and 826. At 824, a first flag signal representative of a first flag applicable to the first data can be generated (e.g., by the flag generation component 116). At 826, a second flag signal representative of a second flag can be generated (e.g., by the flag generation component 116). At 828, the first data can be updated (e.g., by the flag update component 204) to comprise the first flag signal. At 830, the second data can be updated (e.g., by the flag update component 204) to comprise the second flag signal. At 832 the system (e.g., using malicious data component 304) can determine whether the first data comprises malicious data (e.g., according to a malicious data criterion). At 834, the system (e.g., using the malicious data component 304) can determine whether the second data comprises malicious data (e.g., according to the malicious data criterion). At 836, an action can be taken, which can depend on whether the first data and/or the second data comprise malicious data. Thus, at 836, malicious data can be blocked, quarantined, deleted, monitored, or a different suitable action can be taken (e.g., by a system herein).

FIG. 9 illustrates a block flow diagram for a process 900 for generating flag signals in accordance with one or more embodiments described herein. At 902, the process 900 can comprise determining first data, associated with first network equipment, originating at a first origination node of a group of nodes, and second data, associated with second network equipment, originating at a second origination node of the group of nodes. At 904, the process 900 can comprise generating a first identifier associated with the first network equipment and the first origination node and a second identifier associated with the second network equipment and the second origination node. At 906, the process 900 can comprise updating the first data to comprise the first identifier and the second data to comprise the second identifier. At 908, the process 900 can comprise in response to the first data and the second data being determined to be directed to a common destination node, determining whether the first data and the second data are related according to a relation criterion. And, at 910, the process 900 can comprise in response to determining that the first data and the second data are related, generating a first flag signal representative of a first flag applicable to the first data and a second flag signal representative of a second flag applicable to the second data.

Figure 10:
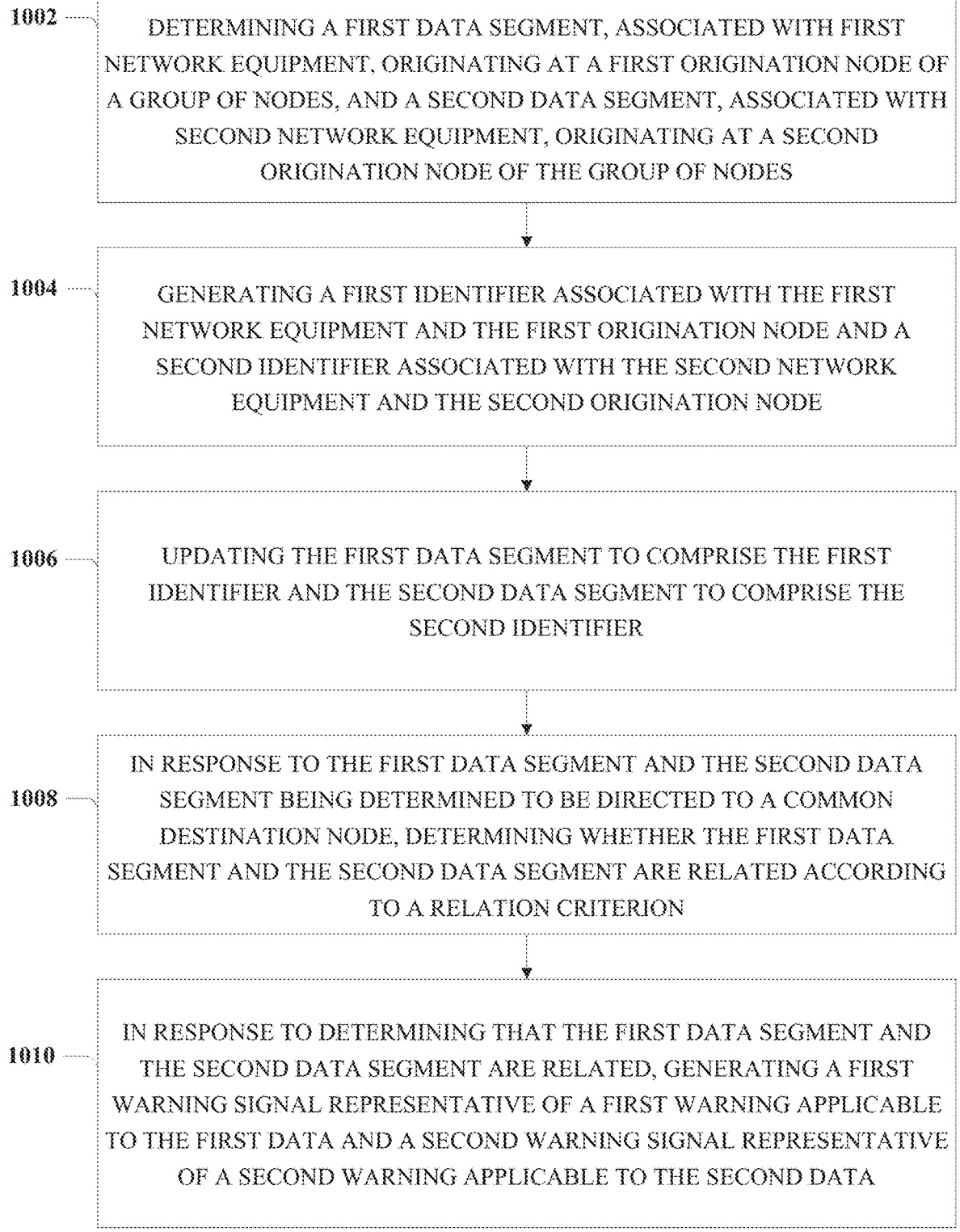
FIG. 10 is a block flow diagram for a process for generating flag signals in accordance with one or more embodiments described herein.

FIG. 10 illustrates a block flow diagram for a process 1000 for generating flag signals in accordance with one or more embodiments described herein. At 1002, the process 1000 can comprise determining a first data segment, associated with first network equipment, originating at a first origination node of a group of nodes, and a second data segment, associated with second network equipment, originating at a second origination node of the group of nodes. At 1004, the process 1000 can comprise generating a first identifier associated with the first network equipment and the first origination node and a second identifier associated with the second network equipment and the second origination node. At 1006, the process 1000 can comprise updating the first data segment to comprise the first identifier and the second data segment to comprise the second identifier. At 1008, the process 1000 can comprise in response to the first data segment and the second data segment being determined to be directed to a common destination node, determining whether the first data segment and the second data segment are related according to a relation criterion. At 1010, the process 1000 can comprise in response to determining that the first data segment and the second data segment are related, generating a first warning signal representative of a first warning applicable to the first data and a second warning signal representative of a second warning applicable to the second data.

Figure 11:
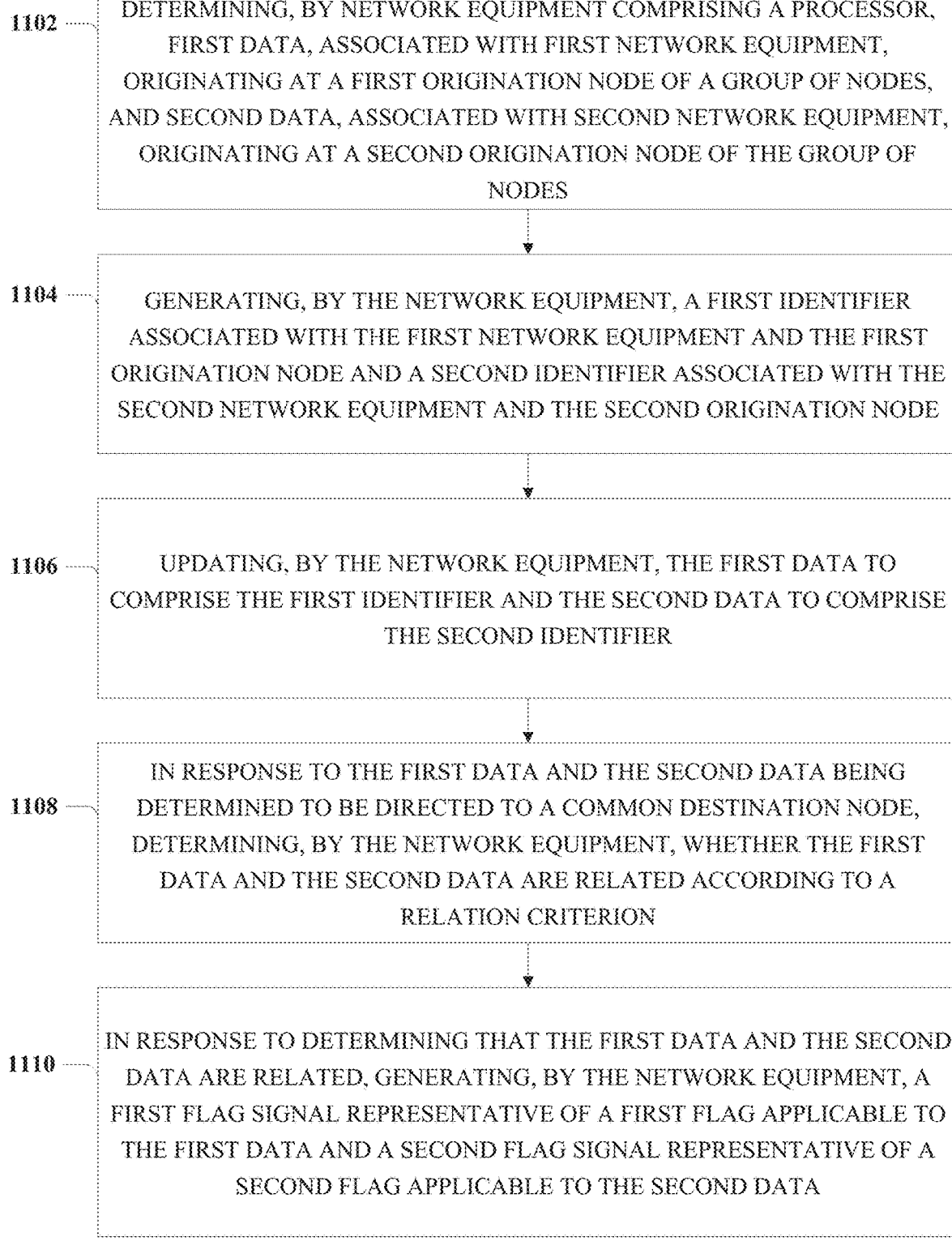
FIG. 11 is a block flow diagram for a process for generating flag signals in accordance with one or more embodiments described herein.

FIG. 11 illustrates a block flow diagram for a process 1100 for generating flag signals in accordance with one or more embodiments described herein. At 1102, the process 1100 can comprise determining, by network equipment comprising a processor, first data, associated with first network equipment, originating at a first origination node of a group of nodes, and second data, associated with second network equipment, originating at a second origination node of the group of nodes. At 1104, the process 1100 can comprise generating, by the network equipment, a first identifier associated with the first network equipment and the first origination node and a second identifier associated with the second network equipment and the second origination node. At 1106, the process 1100 can comprise updating, by the network equipment, the first data to comprise the first identifier and the second data to comprise the second identifier. At 1108, the process 1100 can comprise in response to the first data and the second data being determined to be directed to a common destination node, determining, by the network equipment, whether the first data and the second data are related according to a relation criterion. And, at 1110, the process 1100 can comprise in response to determining that the first data and the second data are related, generating, by the network equipment, a first flag signal representative of a first flag applicable to the first data and a second flag signal representative of a second flag applicable to the second data.

Figure 12:
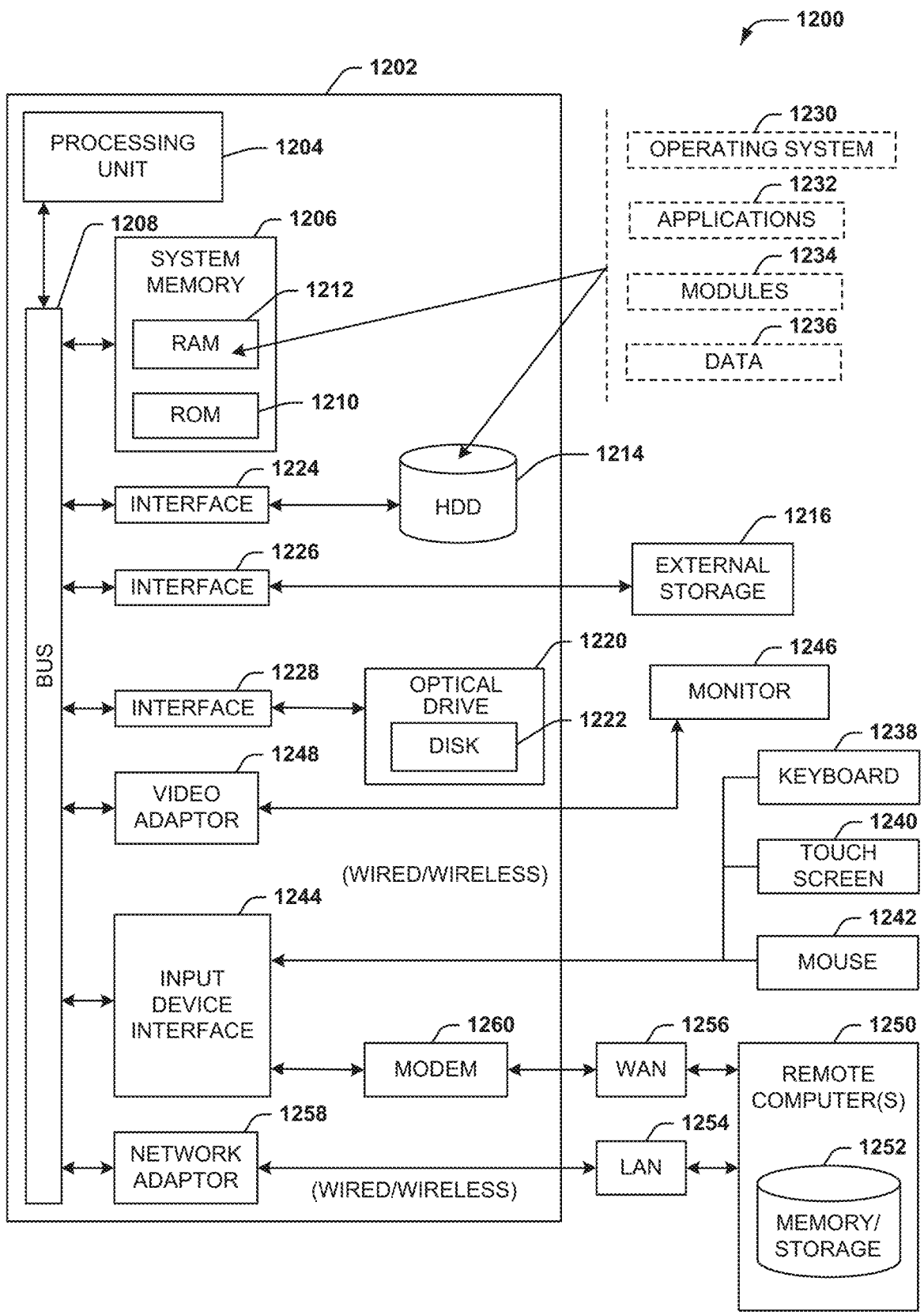
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
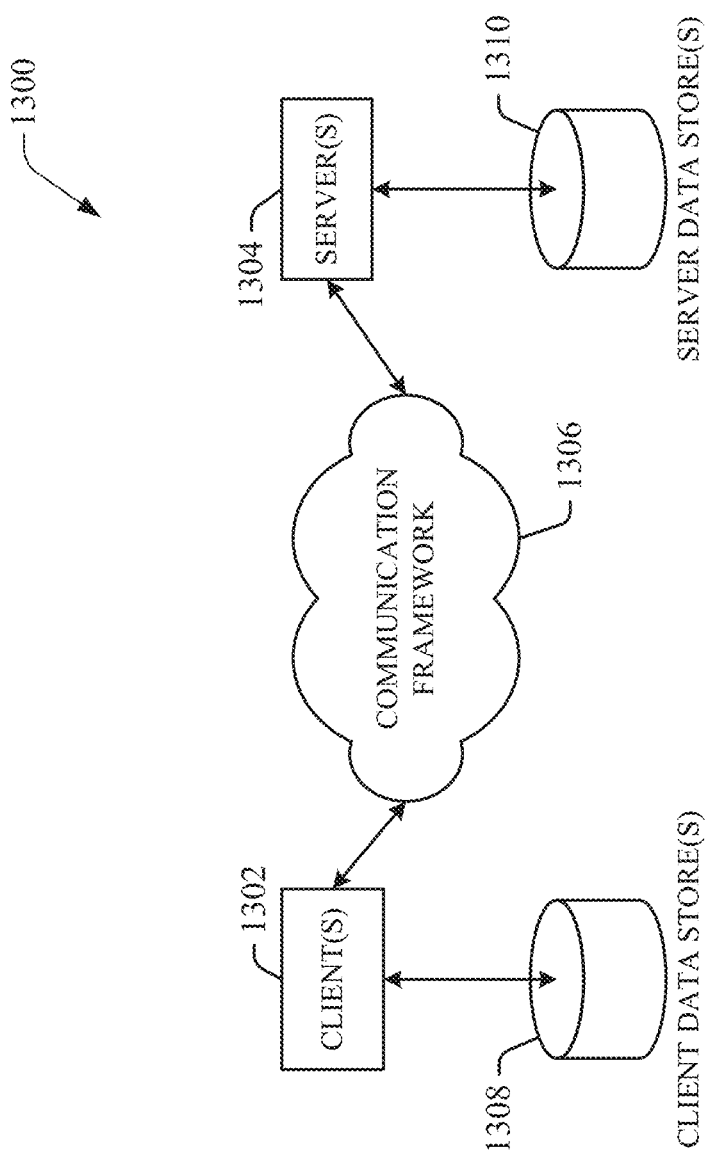
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
   a processor; and
   a memory that stores executable instructions that, when executed by the processor, facilitate performance of operations, comprising:
   determining first data, associated with first network equipment, originating at a first origination node of a group of nodes, and second data, associated with second network equipment, originating at a second origination node of the group of nodes;
   generating a first identifier associated with the first network equipment and the first origination node and a second identifier associated with the second network equipment and the second origination node;
   updating the first data to comprise the first identifier and the second data to comprise the second identifier;
   in response to the first data and the second data being determined to be directed to a common destination node, determining whether the first data and the second data are related according to a relation criterion;
   in response to determining that the first data and the second data are related, generating a first malicious warning flag signal representative of a first malicious warning flag applicable to the first data and a second malicious warning flag signal representative of a second malicious warning flag applicable to the second data; and
   appending the first data with the first malicious warning flag and appending the second data with the second malicious warning flag.

2. The device of claim 1, wherein the first malicious warning flag signal and the second malicious warning flag signal are representative of warning information that enables a warning about malicious network traffic.

3. The device of claim 1, wherein generating the first identifier comprises performing hashing associated with the first identifier, and wherein generating the second identifier comprises performing hashing associated with the second identifier.

4. The device of claim 1, wherein the first malicious warning flag signal comprises first information indicative of a first color label and the second malicious warning flag signal comprises second information indicative of the first color label.

5. The device of claim 1, wherein the first malicious warning flag indicates a first malicious activity, wherein the second malicious warning flag indicates a second malicious activity.

6. The device of claim 1, wherein the relation criterion comprises a common origination criterion.

7. The device of claim 1, wherein the relation criterion is determined using machine learning based on previous data relationships.

8. The device of claim 7, wherein the relation criterion is associated with a commonality of nodes traversed by data traffic.

9. The device of claim 1, wherein the first data and the second data each comprise encrypted data.

10. The device of claim 1, wherein the operations further comprise:
in response to determining that the first data and the second data are related, determining whether the first data or the second data comprise malicious data according to a malicious data criterion.

11. The device of claim 10, wherein the malicious data criterion is determined using machine learning based on previously identified malicious data.

12. The device of claim 1, wherein the first identifier and the second identifier each comprise respective data origination information and data destination information.

13. The device of claim 12, wherein the first identifier further comprises hardware information associated with the first origination node, and wherein the second identifier further comprises hardware information associated with the second origination node.

14. A non-transitory machine-readable medium, comprising executable instructions that, when executed by a processor, facilitate performance of operations, comprising:
determining a first data segment, associated with first network equipment, originating at a first origination node of a group of nodes, and a second data segment, associated with second network equipment, originating at a second origination node of the group of nodes;
generating a first identifier associated with the first network equipment and the first origination node and a second identifier associated with the second network equipment and the second origination node;
updating the first data segment to comprise the first identifier and the second data segment to comprise the second identifier;
in response to the first data segment and the second data segment being determined to be directed to a common destination node, determining whether the first data segment and the second data segment are related according to a relation criterion;
in response to determining that the first data segment and the second data segment are related, generating a first malicious warning signal representative of a first malicious warning applicable to the first data and a second malicious warning signal representative of a second malicious warning applicable to the second data; and
appending the first data with the first malicious warning and appending the second data with the second malicious warning.

15. The non-transitory machine-readable medium of claim 14, wherein the first identifier comprises a first encrypted packet inserted after the first data segment and the second identifier comprises a second encrypted packet inserted after the second data segment.

16. The non-transitory machine-readable medium of claim 14, wherein the relation criterion is determined using machine learning based on previous data relationships.

17. The non-transitory machine-readable medium of claim 16, wherein the relation criterion is associated with a commonality of nodes traversed by data traffic determined using the machine learning based on the previous data relationships.

18. A method, comprising:
determining, by network equipment comprising a processor, first data, associated with first network equipment, originating at a first origination node of a group of nodes, and second data, associated with second network equipment, originating at a second origination node of the group of nodes;
generating, by the network equipment, a first identifier associated with the first network equipment and the first origination node and a second identifier associated with the second network equipment and the second origination node;
updating, by the network equipment, the first data to comprise the first identifier and the second data to comprise the second identifier;
in response to the first data and the second data being determined to be directed to a common destination node, determining, by the network equipment, whether the first data and the second data are related according to a relation criterion;
in response to determining that the first data and the second data are related, generating, by the network equipment, a first malicious warning flag signal representative of a first malicious warning flag applicable to the first data and a second malicious warning flag signal representative of a second malicious warning flag applicable to the second data; and,
appending the first data with the first malicious warning flag and appending the second data with the second malicious warning flag.

19. The method of claim 18, further comprising:
in response to determining that the first data and the second data are related, determining, by the network equipment, whether the first data or the second data comprise malicious data according to a malicious data criterion.

20. The method of claim 19, wherein the malicious data criterion is determined, by the network equipment, using machine learning based on previously identified malicious data.

* * * * *